United States Patent [19]
Kim

[11] Patent Number: 5,886,849
[45] Date of Patent: Mar. 23, 1999

[54] MECHANISM FOR LIFTING A CASSETTE HOLDER IN A CAR AUDIO PLAYER

[75] Inventor: Yu-In Kim, Incheon, Rep. of Korea

[73] Assignee: Daewoo Electronics Co., Ltd., Rep. of Korea

[21] Appl. No.: 870,454

[22] Filed: Jun. 6, 1997

[30] Foreign Application Priority Data

Aug. 29, 1996 [KR] Rep. of Korea ................... 1996-36236
Aug. 29, 1996 [KR] Rep. of Korea ................... 1996-36237
Aug. 29, 1996 [KR] Rep. of Korea ................... 1996-36238

[51] Int. Cl.$^6$ ................................................. G11B 15/26
[52] U.S. Cl. ......................................................... 360/96.5
[58] Field of Search ............................... 360/85, 90, 96.1, 360/93, 96.5, 99.06; 369/75.1, 75.2, 77.2

[56] References Cited

U.S. PATENT DOCUMENTS

| | | | |
|---|---|---|---|
| 4,612,591 | 9/1986 | Tanaka et al. | 360/93 |
| 4,794,476 | 12/1988 | Isaki et al. | 360/93 |
| 4,796,119 | 1/1989 | Kakiaki et al. | 360/93 |
| 5,179,484 | 1/1993 | Nakajima | 360/99.06 |
| 5,189,573 | 2/1993 | Klos-Hein et al. | 360/93 |

*Primary Examiner*—Brian E Miller
*Attorney, Agent, or Firm*—Pillsbury Madison & Sutro, LLP

[57] ABSTRACT

A mechanism for lifting a cassette holder of a car audio player has a roller in contact with a mode changeover for changing operation modes according to an instruction of a control portion. A lifting guidance portion slides in contact with a side chassis by the roller which urges a stopper protruding from one side of the lifting guidance portion. A cassette holder ascends and descends according to the sliding of the lifting guidance portion. The cassette holder is held on a loading position by engaging a hook formed at the lifting guidance portion with a blocking protrusion formed at a position corresponding with the hook. In an unloading mode, the mode changeover lever is held in an unloading condition by a locking portion which is installed at a bottom chassis and then clamps the roller.

25 Claims, 4 Drawing Sheets

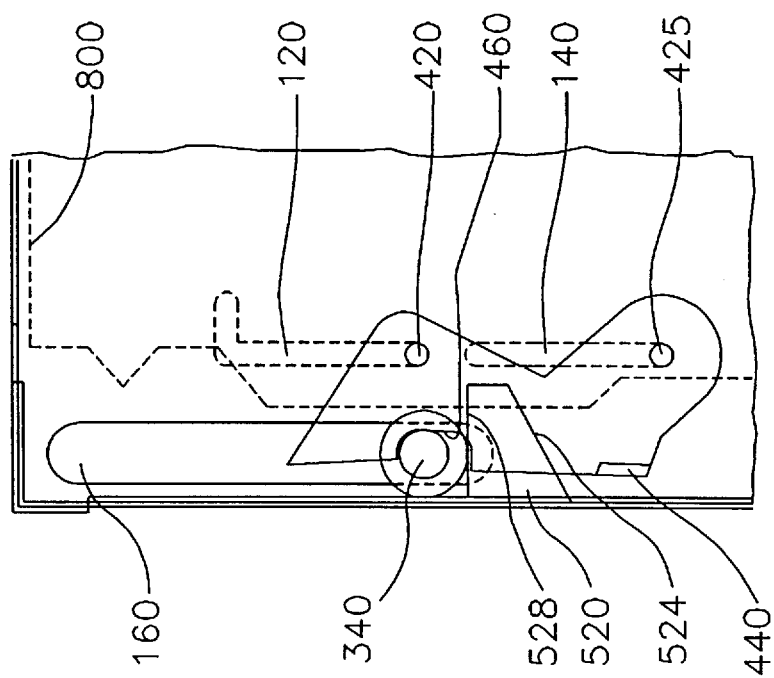
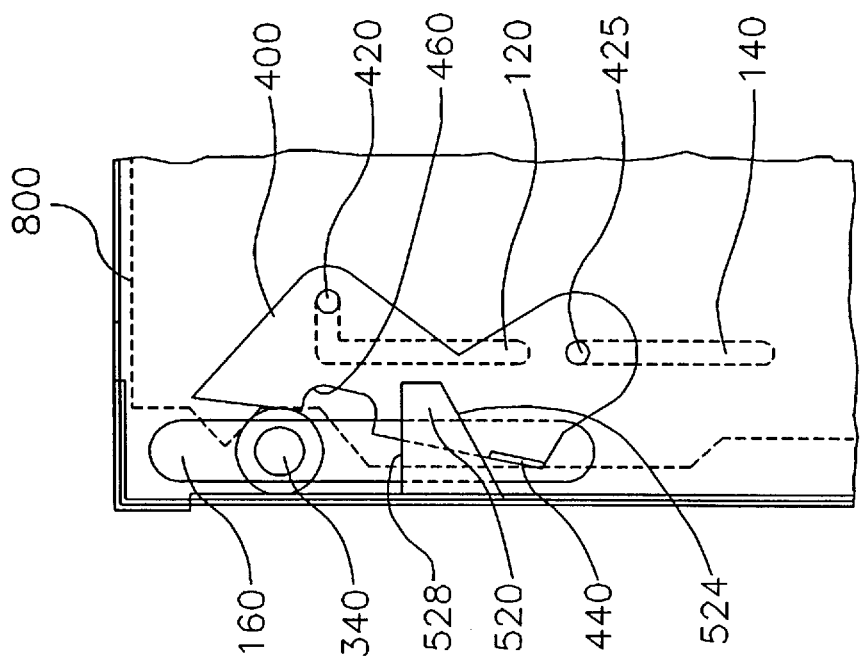

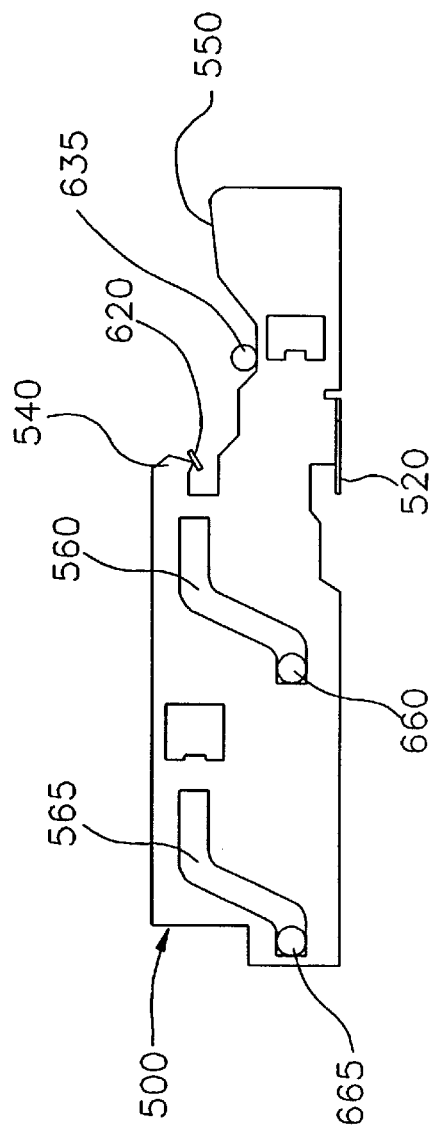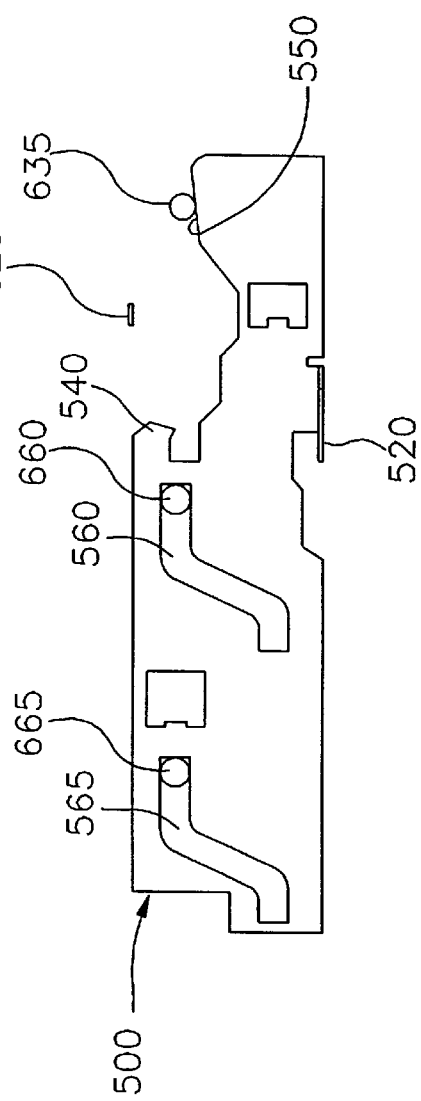

MECHANISM FOR LIFTING A CASSETTE HOLDER IN A CAR AUDIO PLAYER

BACKGROUND OF THE INVENTION

1. Field of the Invention

The present invention relates to a mechanism for lifting a cassette holder in a car audio, more particularly to a mechanism in which a cassette holder ascends along with a lifting guidance portion in an unloading operation and in which the cassette holder descends and holds in a loading operation.

2. Description of the Prior Art

Audio devices recently developed are designed to accomplish various functions like an autoreverse, a section repetition, etc. In particular, the autoreverse function automatically switches a tape traveling direction from a forward direction to a reverse direction and vice versa. Hence, the autoreverse type car audio device has a mode changeover lever for switching operation modes according to an instruction of a control portion. A head, one of pinch rollers, and the cassette holder actuate by the mode changeover lever according to the changeover of the operation modes, an ejecting mode, play mode, changeover mode, etc. The cassette holder actuated relative with the mode changeover lever ascends to eject a tape in a loading mode and descends to read out information recorded on the tape in an unloading mode. Therefore, various mechanisms are proposed to lift the cassette holder according to the operation modes. One of the conventional cassette holder lifting devices comprises springs for ascending and descending the cassette holder according to the operation mode. In tape loading mode, the cassette holder loads the springs against their elastic force and descends. In tape unloading mode, the springs return to their original condition, and the cassette holder ascends by the force of restitution of the springs.

First, however, when a car having an audio system with the conventional cassette holder lifting mechanism travels on the road and an operation mode of the audio system is in a playing mode, a vibration of the car affects the operation of the car audio. The cassette holder vibrates. Thus bad contact between the head and the tape occurs. Hence, a signal quality which is read out from the tape is bad.

Second, in the conventional cassette holder lifting mechanism, when the operation mode is the tape loading mode, the cassette holder actuated relative with a mode changeover lever instantaneously loads the spring against their elastic force. When the operation mode is the unloading mode, the cassette holder instantaneously returns to the original position by the elastic force of the springs. The mode changeover lever is affected by the springs.

Third, the operation mode of the cassette holder is unstable because the cassette holder is placed at the ascending position by the elastic spring in the unloading mode.

SUMMARY OF THE INVENTION

To solve the above problems, it is an object of the present invention to provide a mechanism for lifting a cassette holder of a car audio capable of holding the cassette holder at a descending position in a tape loading mode.

It is an object of the present invention to provide a mechanism for lifting a cassette holder of a car audio capable of holding the cassette holder at an ascending position in an unloading mode.

It is another object of the present invention to provide a mechanism for lifting a cassette holder of a car audio capable of holding a mode changeover lever in the unloading mode.

To achieve the above object, a mechanism for lifting a cassette holder of a car audio according to the present invention comprises:

a bottom chassis installed at a deck chassis of a car audio;

a side chassis enlarged from one side of the bottom chassis with a predetermined height and forming a horizontal moving guidance portion at the side face of the side chassis;

a driving portion having a mode changeover lever installed at a rear face of the bottom chassis and actuated to move by a driving motor;

a lifting guidance portion installed parallel with the side chassis and contacted with the mode changeover lever, the lifting guidance portion capable of sliding in contact with the side face of the side chassis along the horizontal moving guidance portion of the side chassis according to the movement of the mode changeover lever and having a vertical moving guidance portion to move the tape from the loading position to the unloading position and vice versa; and a cassette holder for receiving the tape, the cassette holder ascending and descending along the vertical moving guidance portion according to the slide of the lifting guidance portion.

The lifting guidance portion comprises a stopper protruded inward from a bottom end of the lifting guidance and in contact with the mode changeover lever and a hook protruded from an upper end for safely holding the cassette holder on a loading condition. The cassette holder comprises a contacting portion in contact with the side chassis. The contacting portion comprises a blocking protrusion protruded from one end of the contacting portion for engaging with the hook. The mode changeover lever is installed at the bottom chassis by connecting a roller. The locking portion comprises a concave form at one side for clamping the roller in contact with the mode changeover lever, shafts movably contacting with the bottom chassis, and a jut folded and enlarged from one side for moving over the stopper. The shafts of the locking portion contact with a curved guidance path and a straight guidance path on the bottom chassis. The locking portion moves along the curved guidance path and the straight path and rotates.

As described above, in the mechanism for lifting the cassette holder of the car audio, first, when the cassette holder is placed in a loading position the cassette holder is safely held by engaging the hook formed at the lifting guidance portion with the blocking protrusion of the cassette holder. Although the vibration occurring in the loading operation affects the cassette holder, a head and the tape still have good contact. Hence, a signal read out from the tape is prevented from being distorted.

Second, the cassette holder softly ascends along the lifting guidance portion because the roller connected with the mode changeover lever urges the stopper. Thus, the load affecting the mode changeover lever is reduced.

Third, in the unloading mode the locking portion rotates along the curved guidance path and urges the stopper of the lifting guidance portion. The cassette holder is held in the unloading position. Although a car body vibrates, the stability of operation is ensured. Also, in the loading mode the mode changeover lever is stably held in the loading position.

BRIEF DESCRIPTION OF THE DRAWINGS

The present invention will be better understood and its various objects and advantages will be more fully appreciated from the following description taken in conjunction with the accompanying drawings, in which:

FIG. 3 is a plan view which shows a contact condition between a roller connected with a mode changeover lever and a locking portion during a loading mode in the mechanism for lifting the cassette holder of the car audio according to the present invention;

FIG. 4 is a plan view which shows a contact condition between a roller connected with a mode changeover lever and a locking portion during an unloading mode in the mechanism for lifting the cassette holder of the car audio according to the present invention;

FIG. 5 shows a relation between the cassette holder and a lifting guidance portion during the loading mode in the mechanism for lifting the cassette holder of the car audio according to the present invention; and FIG. 6 shows a relation between the cassette holder and a lifting guidance portion during the unloading mode in the mechanism for lifting the cassette holder of the car audio according to the present invention.

DETAILED DESCRIPTION OF THE PREFERRED EMBODIMENT

Hereinafter, a mechanism for lifting a cassette holder of a car audio according to the present invention will be described in detail with reference to the FIG. 1 through FIG. 6.

Figure 1:
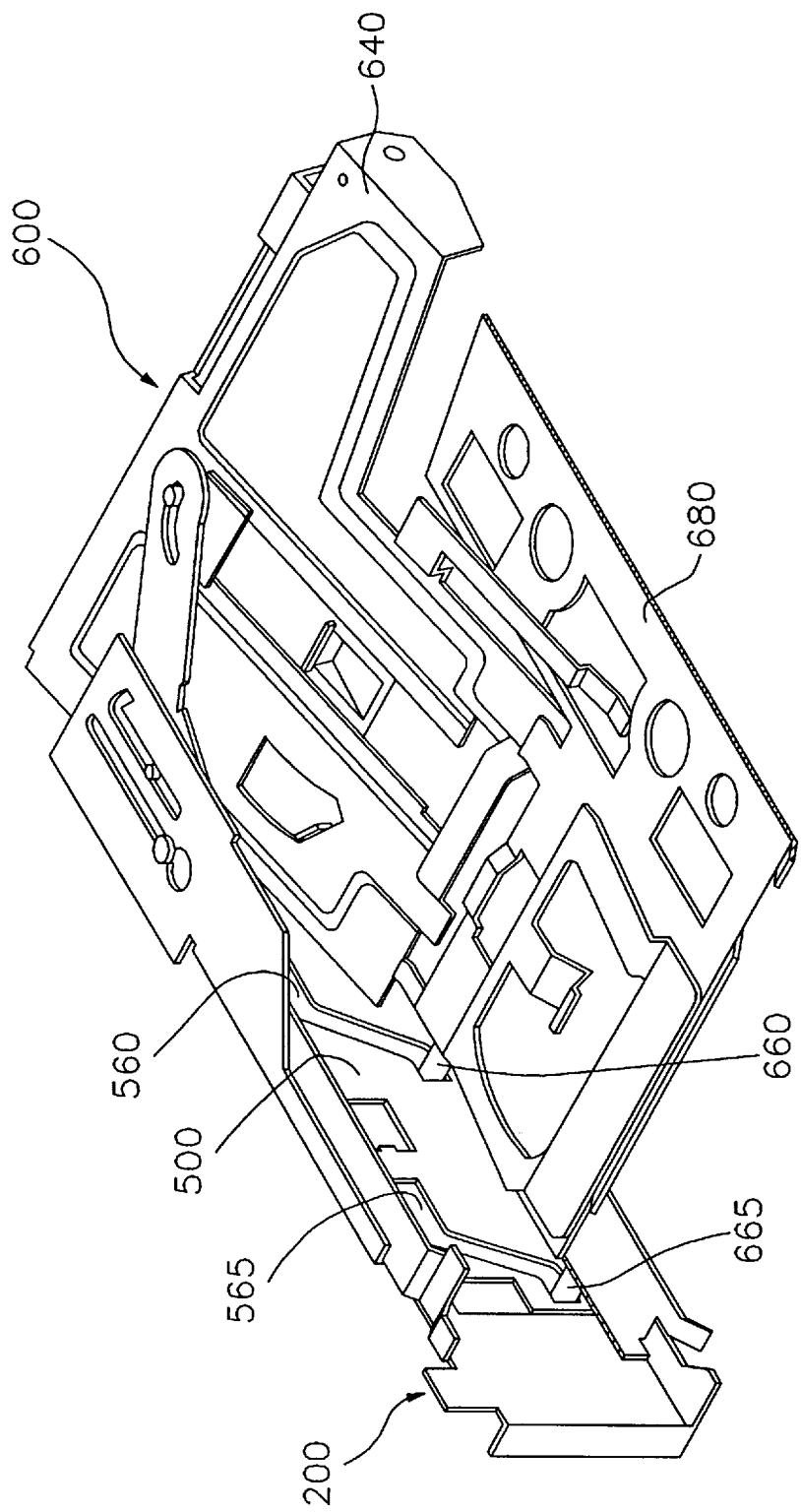
FIG. 1 is a perspective view of a car audio deck installed with a mechanism for lifting a cassette holder of a car audio according to the present invention.
Figure 2:
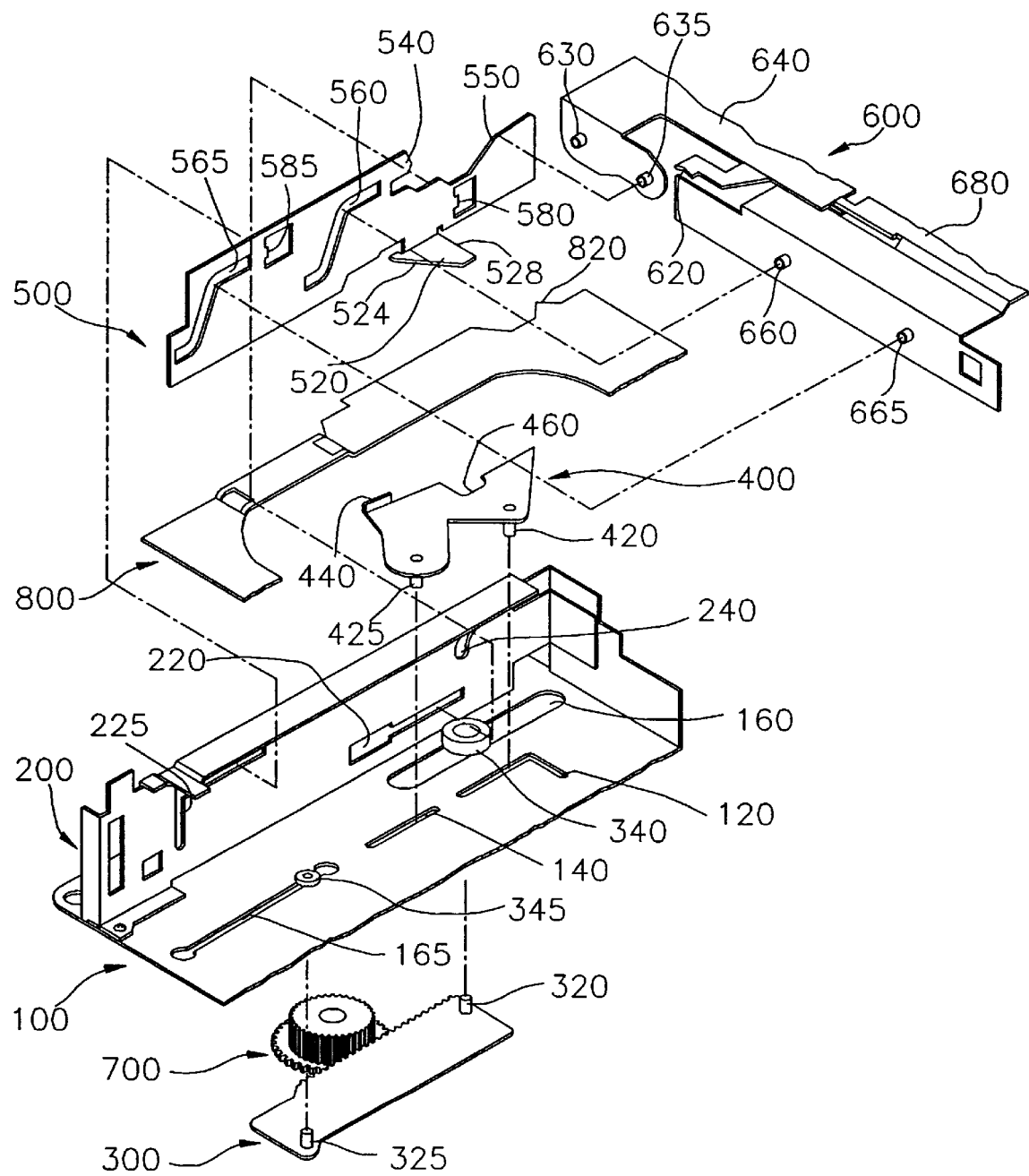
FIG. 2 is an exploded perspective view of the mechanism for lifting the cassette holder of the car audio according to the present invention.

FIG. 1 is a perspective view of a car audio deck installed with a mechanism for lifting a cassette holder of a car audio according to the present invention, FIG. 2 is an exploded perspective view of the mechanism for lifting the cassette holder of the car audio according to the present invention, FIG. 3 is a plan view which shows a contact condition between a roller connected with a mode changeover lever and a locking portion during a loading mode in the mechanism for lifting the cassette holder of the car audio according to the present invention, FIG. 4 is a plan view which shows a contact condition between a roller connected with a mode changeover lever and a locking portion during an unloading mode in the mechanism for lifting the cassette holder of the car audio according to the present invention, FIG. 5 shows a relation between the cassette holder and a lifting guidance portion during the loading mode in the mechanism for lifting the cassette holder of the car audio according to the present invention, and FIG. 6 shows a relation between the cassette holder and a lifting guidance portion during the unloading mode in the mechanism for lifting the cassette holder of the car audio according to the present invention.

In the drawings, a reference number 100 indicates a bottom chassis, and a reference number 200 indicates a side chassis. Bottom chassis 100 is installed at a deck chassis(not shown) of a car audio. Side chassis 200 is one lateral side of bottom chassis 100 with a predetermined height. A mode changeover lever 300, which is controlled by a control portion(not shown) that determines an operation mode, is movably installed at a rear face of bottom chassis 100 for loading and unloading a tape. Mode changeover lever 300 has a rack gear engaged with a pinion gear 700 actuated relative with a driving motor(not shown). A lifting guidance portion 500 is installed in contact with a side face of side chassis 200, and one side of lifting guidance portion 500 is in contact with mode changeover lever 300. A locking portion 400 is installed at bottom chassis 100 for actuating relative with lifting guidance portion 500 and mode changeover lever 300. A head mounting portion 800 is installed over locking portion 400 for holding the locking portion 400. Head mounting portion 800 has a mode changeover cam 820 for providing a path to move roller 340 thereover according to the operation mode. A cassette holder 600 is installed in contact with lifting guidance portion 500 for ascending and descending parallel with deck chassis 100.

Bottom chassis 100 defines guidance paths 160, 165 for leading mode changeover lever 300, a curved guidance path 120, and a straight guidance path 140 for leading locking portion 400. Guidance paths 160, 165 are formed in parallel. Curved guidance path 120 and straight guidance path 140 are arranged straight. Mode changeover lever 300 has connecting pins 320, 325 which slide along guidance paths 160, 165. Connecting pins 320, 325 are formed at a position corresponding with guidance paths 160, 165 for safely installing mode changeover lever 300 at bottom chassis 100. Connecting pins 320, 325 are in contact with rollers 340, 345 movably installed at bottom chassis 100 for actuating lifting guidance portion 500 and locking portion 400 relative with mode changeover lever 300.

Side chassis 200 defines horizontal moving guidance portions 220, 225 for leading lifting guidance portion 500 to slide thereon and a contacting hole 240 for limiting a range of movement of cassette holder 600. Guidance protrusions 580, 585 protrude from one side of lifting guidance portion 500 toward side chassis 200 in contact with horizontal moving guidance portions 220, 225. A stopper 520 actuated relative with roller 340 is protrudes from a lower end of lifting guidance portion 500 toward locking portion 400. A cam 550 for leading cassette holder 600 is formed at one side of an upper end of lifting guidance portion 500 in a loading mode and an unloading mode. A hook 540 for holding cassette holder 600 in a loading condition protrudes from one end of cam 550. Lifting guidance portion 500 defines vertical moving guidance portions 560, 565 for leading cassette holder 600 to ascend and descend. Vertical moving guidance portions 560, 565 are formed in an S shape and arranged parallel to each other. Upper ends of the vertical moving guidance portions 560, 565 are to hold cassette holder 600 at an ascending position in the loading mode. Lower ends of the vertical guidance portions 560, 565 are to hold cassette holder 600 at an descending position in the unloading mode. Stopper 520 comprises an inclined end 524 which is urged by locking portion 400 and a straight end which is in contact with roller 340 to the slide lifting guidance portion 500.

Guidance pins 420, 425 protrude from a rear face of locking portion 400 for connecting with curved guidance path 120 and straight path 140. A jut 440 is folded from one end of locking portion 400 toward an upper direction to slide lifting guidance portion 500 on bottom chassis 100 by moving along an inclined end 524 of stopper 520. Locking portion 400 defines a concave 460 formed at the end of locking portion 400 for clamping roller 340 to hold mode changeover lever 300 in the loading mode. Cassette holder 600 comprises a contacting portion 640 in contact with side chassis 200 and a sliding portion 680 for holding the tape in an appropriate position according to the operation mode. Contacting portion 640 comprises a contacting protrusion 630 in contact with side chassis 200, a moving protrusion 635 moved along with cam 550 of lifting guidance portion 500, and a blocking protrusion 620 engaged with hook 540 of lifting guidance portion 500 for holding cassette holder 200 in the loading condition. Contacting protrusion 630 and moving protrusion 635 protrude from a side face of contacting portion 640. Blocking protrusion 620 protrudes from one end of contacting portion 640. Sliding portion 680 is connected with contacting portion 640 and has sliding protrusions 660, 665 in contact with vertical moving guidance portions 560, 565. Sliding protrusions 660, 665 move along the vertical moving guidance portions 560, 565.

The operations and effects of the mechanism for lifting the cassette holder of the car audio are described below with reference to FIG. 1 through FIG. 6.

The tape(not shown) is inserted into the cassette holder 600. The inserted tape starts to move toward the loading position. The roller 340 connected with mode changeover lever 300 moves along guidance path 160 according to driving of mode changeover lever 300 from straight guidance path 140 toward curved guidance path 120.

Jut 440 of locking portion 400 moves along the inclined end 524 of stopper 520 of lifting guidance portion 500. At that time, shafts 420, 425 of locking portion 400 individually slide along the curved guidance path 120 and straight guidance path 140. Locking portion 400 rotates around shaft 425 when shaft 420 moves along a curved portion of curved guidance path 120. According to the rotation of locking portion 400, roller 340 is free from concave 460 of locking portion 400, and jut 440 urges stopper 520. Lifting guidance portion 500 slides along horizontal moving guidance portions 220, 225 of side chassis 200. Moving protrusion 635 of cassette holder 600 moves over cam 550 of lifting guidance portion 500, and sliding protrusions 660, 665 move along the vertical moving guidance portions 560, 565. Blocking protrusion 620 engages with hook 540 of lifting guidance portion 500 according to the movement of sliding protusions 660, 665 and moving protrusion 635 of cassette holder 600. As a result, cassette holder 600 is held in the loading position.

In the unloading mode, roller 340 starts to move along guidance path 160 from curved guidance path 120 toward straight guidance path 140. Roller 340 urges the straight portion 528 of stopper 520 of lifting guidance portion 500. Inclined portion 524 of stopper 520 urges jut 440 of locking portion 400. Shafts 420, 425 of locking portion 400 slide along curved guidance path 120 and straight guidance path 140. Concave 460 of locking portion 400 clamps the roller 340 when shaft 420 moves along the curved portion of curved guidance path 120. Lifting guidance portion 500 slides from curved guidance path 120 toward straight guidance path 140. Sliding protrusions 660, 665 of cassette holder 600 ascend along the vertical moving guidance portions 560, 565 and moving protrusion 635 moves along cam 550. Blocking protrusion 620 of cassette holder 600 is free from hook 540 of lifting guidance portion 500. Roller 340 is clamped by concave 460 of locking portion 400, and cassette holder 600 is placed in the unloading position. Mode changeover lever 300 and lifting guidance portion 500 are held in the unloading condition.

As described above, in the mechanism for lifting the cassette holder of the car audio, first, when the cassette holder is placed in a loading position the cassette holder is safely held by engaging the hook formed at the lifting guidance portion with the blocking protrusion of the cassette holder. Although a vibration occurring the loading operation affects the cassette holder, a head and the tape still have good contact. Hence, a signal readout from the tape is prevented from being distorted.

Second, the cassette holder softly ascends along the lifting guidance portion because the roller connected with the mode changeover lever urges the stopper. Thus, the load affecting the mode changeover lever is reduced.

Third, in the unloading mode the locking portion rotates along the curved guidance path and urges the stopper of the lifting guidance portion. The cassette holder is held in the unloading position. Although the car body vibrates, the operation of the cassette holder is stable. Also, in the loading mode the mode changeover lever is stably held in the loading position.

Although the present invention has been described in detail, it is not to be taken by way of limitation wherein the spirit and scope of the present invention is limited only by the terms of the appended claims.

What is claimed is:

1. A mechanism for lifting a cassette holder of a car audio player according to the present invention comprises:

a bottom chassis installed at a deck chassis of a car audio player;

a side chassis attached to one lateral side of said bottom chassis with a predetermined height and having a horizontal moving guidance portion and a contacting hole;

a driving portion having a mode changeover lever installed at a rear face of said bottom chassis and actuated to move by a driving motor for determining operation modes of the mechanism;

a lifting guidance portion installed parallel with said side chassis and contacted with said mode changeover lever, said lifting guidance portion sliding in contact with the side face of said side chassis along said horizontal moving guidance portion of said side chassis according to the operation modes and having a vertical moving guidance portion to move a tape from a loading position to an unloading position and vice versa; and a cassette holder for receiving the tape, said cassette holder ascending and descending along said vertical moving guidance portion according to the slide of said lifting guidance portions;

wherein said horizontal moving guidance portion leads the lifting guidance portion to slide in contact with the side chassis, and the contacting hole limits a movement range of the cassette holder.

2. The mechanism for lifting a cassette holder of a car audio player as claimed in claim 1, wherein said vertical moving guidance portion of said lifting guidance portion is formed in an S shape to hold said cassette holder at the loading position and the unloading position.

3. The mechanism for lifting a cassette holder of a car audio player as claimed in claim 2, wherein said vertical moving guidance portion forms a hole.

4. The mechanism for lifting a cassette holder of a car audio player as claimed in claim 1, wherein said lifting guidance portion comprises:

horizontal moving guidance protrusions protruded toward said side chassis capable of connecting with said horizontal moving guidance portions;

a stopper protruded inward from a bottom end of said lifting guidance and in contact with said mode changeover lever;

a cam formed at an upper end of said lifting guidance portion for guiding said cassette holder in the loading and the unloading mode; and a hook protruded from one end of said cam for safely holding said cassette holder on a loading condition.

5. The mechanism for lifting a cassette holder of a car audio player as claimed in claim 4, wherein said cassette holder comprises:

a contacting portion having a contacting protrusion in contact with said side chassis and a moving protrusion to move along said cam of said lifting guidance portion; and a sliding portion formed separate from said contacting portion to connect with said contacting portion and in contact with said vertical moving guidance portion, said sliding portion having sliding protrusions protruded toward said lifting guidance portion at positions corresponding with said vertical moving guidance portion.

6. The mechanism for lifting a cassette holder of a car audio player as claimed in claim 5, wherein said contacting portion further comprises a blocking protrusion protruded from one end of said contacting portion, said blocking protrusion engaging with said hook of said lifting guidance portion for holding said cassette holder at the loading position.

7. The mechanism for lifting a cassette holder of a car audio player as claimed in claim 4, wherein said mode changeover lever comprises connecting pins protruded toward said bottom chassis which are connected with rollers installed at the upper face of said bottom chassis to move over said bottom chassis.

8. The mechanism for lifting a cassette holder of a car audio player as claimed in claim 7, wherein said bottom chassis comprises guidance path formed parallel with said side chassis for guiding said connecting pins.

9. The mechanism for lifting a cassette holder of a car audio player as claimed in claim 8, wherein a locking portion is installed at said bottom chassis for assisting said lifting guidance portion to slide over said side chassis and for holding said mode changeover lever in the unloading mode.

10. The mechanism for lifting a cassette holder of a car audio player as claimed in claim 9, wherein said locking portion holds said mode changeover lever by rotating over the upper face of said bottom chassis.

11. The mechanism for lifting a cassette holder of a car audio player as claimed in claim 10, wherein said locking portion comprises:
    a concave formed at one side for clamping said roller in contact with said mode changeover lever;
    shafts formed at a rear face for movably contacting with said bottom chassis; and
    a jut folded and enlarged from one side for moving over one side of said stopper in a contact condition.

12. The mechanism for lifting a cassette holder of a car audio player as claimed in claim 11, wherein said one side of said stopper in contact with said jut is inclined.

13. The mechanism for lifting a cassette holder of a car audio player as claimed in claim 10, wherein said shafts of said locking portion contact with a curved guidance path which guides one of said shafts, and a straight guidance path, which guides the other shaft, to rotate said locking portion.

14. The mechanism for lifting a cassette holder of a car audio player as claimed in claim 13, wherein said curved guidance path and said straight guidance path are arranged in a straight line.

15. A mechanism for lifting a cassette holder of a car audio player according to the present invention comprises:
    a bottom chassis installed at a deck chassis of a car audio player;
    a side chassis attached to one lateral side of said bottom chassis with a predetermined height and forming a horizontal moving guidance portion at side face of said side chassis;
    a driving portion having a mode changeover lever installed at a rear face of said bottom chassis and actuated to move by a driving motor for determining operation modes of the mechanism;
    a lifting guidance portion installed parallel with said side chassis and contacted with said mode changeover lever, said lifting guidance portion sliding in contact with the side face of said side chassis along said horizontal moving guidance portion of said side chassis according to the operation modes and having a vertical moving guidance portion to move a tape from a loading position to an unloading position and vice versa; and
    a cassette holder for receiving the tape, said cassette holder ascending and descending along said vertical moving guidance portion according to a slide of said lifting guidance portion;
    wherein said vertical moving guidance portion of said lifting guidance portion is formed in a S shape to hold said cassette holder at the loading position and the unloading position;
    wherein said lifting guidance portion comprises:
        horizontal moving guidance protrusions protruded toward said side chassis capable of connecting with said horizontal moving guidance portions;
        a stopper protruded inward from a bottom end of said lifting guidance, making contact with said mode changeover lever;
        a cam formed at an upper end of said lifting guidance portion for guiding said cassette holder in a loading and an unloading modes; and
        a hook protruded from one end of said cam for safely holding said cassette holder on a loading condition.

16. The mechanism for lifting a cassette holder of a car audio player as claimed in claim 15, wherein said cassette holder comprises:
    a contacting portion having a contacting protrusion in contact with said side chassis and a moving protrusion to move along said cam of said lifting guidance portion; and
    a sliding portion formed separate from said contacting portion to connect with said contacting portion, making contact with said vertical moving guidance portion, said sliding portion having sliding protrusions protruded toward said lifting guidance portion at positions corresponding with said vertical moving guidance portion.

17. The mechanism for lifting a cassette holder of a car audio player as claimed in claim 16, wherein said contacting portion further comprises a blocking protrusion protruded from one end of said contacting portion, said blocking protrusion engaging with said hook of said lifting guidance portion for holding said cassette holder at the loading position.

18. The mechanism for lifting a cassette holder of a car audio player as claimed in claim 15, wherein said mode changeover lever comprises connecting pins protruded toward said bottom chassis which are connected with rollers installed at the upper face of said bottom chassis to move over said bottom chassis.

19. The mechanism for lifting a cassette holder of a car audio player as claimed in claim 18, wherein said bottom chassis comprises a guidance path formed parallel with said side chassis for guiding said connecting pins.

20. The mechanism for lifting a cassette holder of a car audio player as claimed in claim 19, wherein a locking portion is installed at said bottom chassis for assisting said lifting guidance portion to slide over said side chassis and for holding said mode changeover lever in the unloading mode.

21. The mechanism for lifting a cassette holder of a car audio player as claimed in claim 20, wherein said locking portion holds said mode changeover lever by rotating over the upper face of said bottom chassis.

22. The mechanism for lifting a cassette holder of a car audio player as claimed in claim 21, wherein said locking portion comprises:

- a concave formed at one side for clamping said roller in contact with said mode changeover lever; shafts formed at a rear face for movably contacting with said bottom chassis; and
- a jut folded and enlarged from one side for moving over one side of said stopper in a contact condition.

23. The mechanism for lifting a cassette holder of a car audio player as claimed in claim 22, wherein said one side of said stopper in contact with said jut is inclined.

24. The mechanism for lifting a cassette holder of a car audio player as claimed in claim 21, wherein said shafts of said locking portion makes contact with a curved guidance path which guides one of said shafts, and a straight guidance path, which guides the other shaft, to rotate said locking portion.

25. The mechanism for lifting a cassette holder of a car audio player as claimed in claim 24, wherein said curved guidance path and said straight guidance path are arranged in a straight line.

* * * * *